Sept. 29, 1953     W. G. FINLAYSON     2,653,626

POWER TRANSMISSION

Filed Sept. 14, 1946

INVENTOR.
WILLIAM G. FINLAYSON
BY *Ralph L. Tweedale*
ATTORNEY

Patented Sept. 29, 1953

2,653,626

UNITED STATES PATENT OFFICE 2,653,626

POWER TRANSMISSION

William G. Finlayson, Detroit, Mich., assignor to Vickers Incorporated, Detroit, Mich., a corporation of Michigan Application September 14, 1946, Serial No. 697,140

4 Claims. (Cl. 137—599.2)

This invention relates to power transmission, particularly to those of the type comprising two or more fluid pressure energy translating devices, one of which may function as a pump and another as a fluid motor.

The invention is more particularly concerned with a counter-balance valve for use in a hydraulic power transmission requiring a valve for controlling the flow of pressure fluid in one direction and providing free flow in the opposite direction. Counter-balance valves are very often used in hydraulic transmissions for counteracting the weight of a machine element driven in opposite directions by a vertical cylinder-piston motor. The weight of the machine element, such as the platen of a vertical press or the tool slide of a vertical broaching machine, constantly urges the piston of the motor downwardly by gravity. It has been the custom to use a counter-balance valve in such hydraulic transmissions for applying a back pressure on the piston of the motor on the downward stroke equalizing or slightly exceeding the force exerted by the weight of the machine element.

It has been a problem in the past to design a counterbalance valve which would be effective not only to prevent creepage of the motor when stopped but which would also prevent chattering during the downward stroke of the motor. Creepage is the result of leakage through the counterbalance valve from the load end of the motor when the motor is stopped with the load partially or totally suspended. Chattering is the result of an uncontrolled flow of fluid from the load end of the motor through the counterbalance valve when the latter is opened by some form of pressure responsive means to permit discharge flow from the load end of the motor on the downward stroke thereof. As a matter of fact chattering is merely the result of an alternate series of gravity drops and stops.

In the past the problem has been doubly complicated by the necessity of choice between check valve and spool type valve constructions. Although the check valve construction prevented leakage and consequently creepage it was practically useless for controlling flow from the load end of the motor and preventing chattering. Although the spool type of valve construction was better suited for controlling the flow of fluid from the load end of the motor to prevent chattering it was subject to leakage resulting in creepage of the motor. In addition one type of counterbalance valve suited for one type of hydraulic transmission system was entirely inadequate for another type of hydraulic transmission system having a different load characteristic.

It is therefore an object of this invention to provide a counter-balance valve for a hydraulic system having a fluid pump and reversible fluid motor, the latter of which is constantly being urged in one direction of actuation by a load device, which will successfully meet the requirements of a variety of said systems.

It is also an object of the present invention to provide a counter-balance valve for a hydraulic system as above mentioned which will prevent creeping of the motor upon stopping the latter and which is adjustable to overcome chattering.

It is also an object of this invention to provide a counter-balanced valve for a hydraulic system as above stated which may be economically manufactured, which will be reliable and give long life, and which is constructed to contribute to ease of maintenance.

Further objects and advantages of the present invention will be apparent from the following description, reference being had to the accompanying drawings wherein a preferred form of the present invention is clearly shown.

Figures 1, 2:
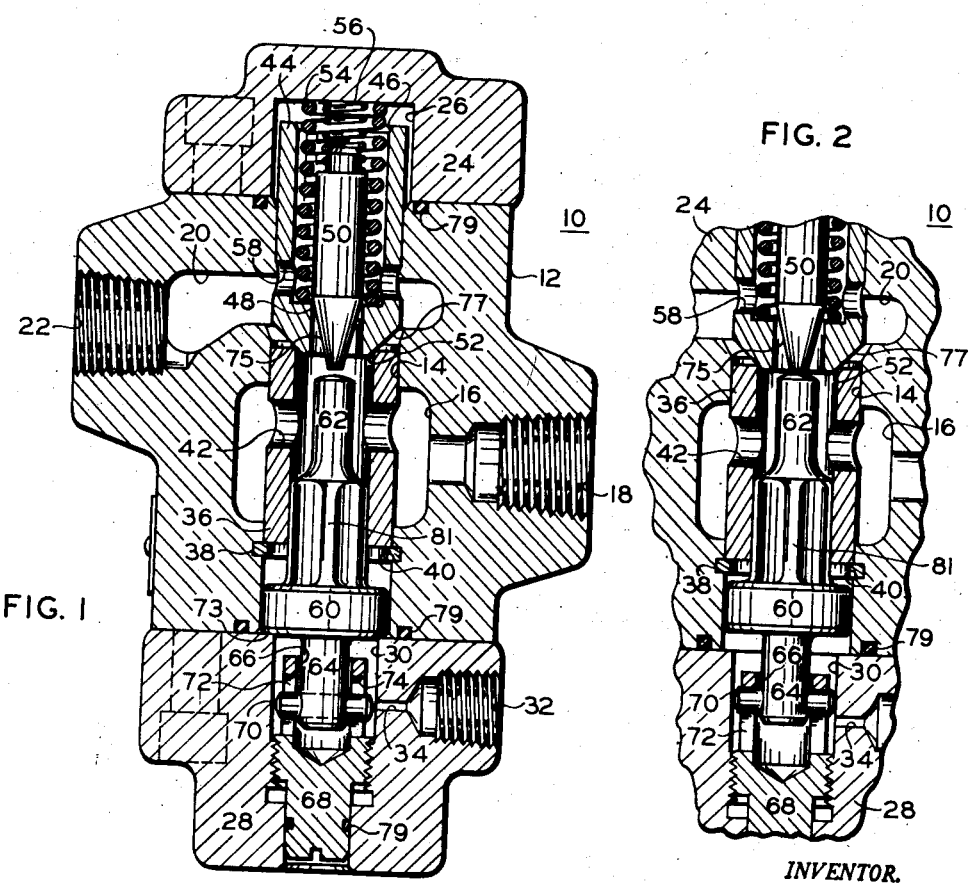
Figure 1 is a sectional view of a preferred form of the present invention.
Figure 2 is a partial sectional view corresponding to that of Figure 1, but with the parts thereof shown in a different position during operation.

Referring now to Figure 1, there is shown a counterbalance valve 10 which is provided with a body 12 having a longitudinal bore 14 which is recessed to form an inlet chamber indicated by the numeral 16, the latter of which is connected to an inlet port 18, and which also contains a recess 20 connected to an outlet port 22. Suitably bolted to the top of the body 12 is an end cap 24 having a bore 26 adapted to register with bore 14 of the body 12. Also suitably bolted to the lower end of the body 12 is an end cap 28 having a bore extending completely therethrough adapted to be in alignment with the bore 14 and the bore 26. The lower end cap 28 is provided with a control port 32 which is connected to the bore 30 thereof by means of a passage 34. Tightly inserted in bore 14 is a sleeve 36 the lower end of which abuts a snap ring 38 fitted into a groove 40 of the bore 14. The sleeve 36 is provided with a plurality of ports 42 forming a means of communication between the interior of the sleeve and the inlet chamber 16.

Shiftably mounted in bore 14 of the body 12 and bore 26 of end cap 24 is a check valve member 44 having a stepped bore 46 extending completely therethrough, the lower end of which forms a seat indicated by the numeral 48 for a second check valve member 50. The member 44 is biased upon a seat 52 formed at the upper end of sleeve 36 by a spring 54 and the valve 50 is biased upon the seat 48 formed in the member 44 by means of a spring 56. The springs 54 and 56 offer a slight resistance so that free flow is permitted from the inlet port 18 to the outlet port 22. By means of a plurality of ports 58 formed in the member 44, pressure fluid at the outlet port 22 attempting to flow in the direction of inlet port 18 biases member 44 upon seat 48 and valve 50 upon seat 52 so as to prevent flow from the outlet port 22 to the inlet port 18.

A piston 60 reciprocably mounted in the bore 14 has a portion 62 extending into the sleeve 36 adapted to unseat valve 50 from the seat 48 when flow is directed from the outlet to the inlet so as to form a restricted opening in the seat 48. The piston 60 has a lower portion 64 extending into a bore 66 formed in a plug 68 the latter of which is threaded into the bore 30 of end cap 28. A pin 70 driven through the plug 68 is adapted on the upwardly stroke of piston 60 to abut one end of a slot 72 formed in the bore portion of plug 68 so as to limit the upward travel of piston 60. The piston 60 is normally adapted to rest upon a shoulder 73 formed when end cap 28 is bolted to body 12 due to the difference in the diameters of the bore 30 of end cap 28 and bore 14 of body 12. By unscrewing plug 68, the upward travel of piston 60 is shortened due to the fact that the pin 70 in projection 64 will encounter the abutment indicated by the numeral 74 formed at the end of the slot 72 after a movement shortened to the extent of the adjustment of plug 68.

When the piston 60 is shifted upwardly, fluid displacement from the chamber above the piston 60 is connected to the port 18 by means of flat 81 provided between the portion 62 extending into the sleeve 36 and the piston 60.

The invention in its preferred form purposely incorporates a sharp edged seat 48 in the member 44 and a tapered surface indicated by the numeral 75 at the lower end of valve 50 for controlling the opening of seat 48. In addition, the seat 52 formed at the upper end of sleeve 36 is also sharp edged and the lower seating surface of the member 44 indicated by the numeral 77 is also tapered. Thus, when used in transmissions containing a double-acting fluid motor driving a vertical load, the load end of such motor being connected to the outlet port 22, leakage from the outlet port 22 to the inlet port 18 is absolutely prevented by this construction. Consequently, when the motor is stopped this prevention of leakage absolutely prevents the motor from creeping. In addition, the opening of seat 48 may be regulated to fit the requirements of a variety of hydraulic transmissions and may be regulated to eliminate chattering when encountered in a particular transmission. Suitable seals indicated by the numeral 79 are provided between the end caps and the body and at the lower end of plug 68.

Figure 3:
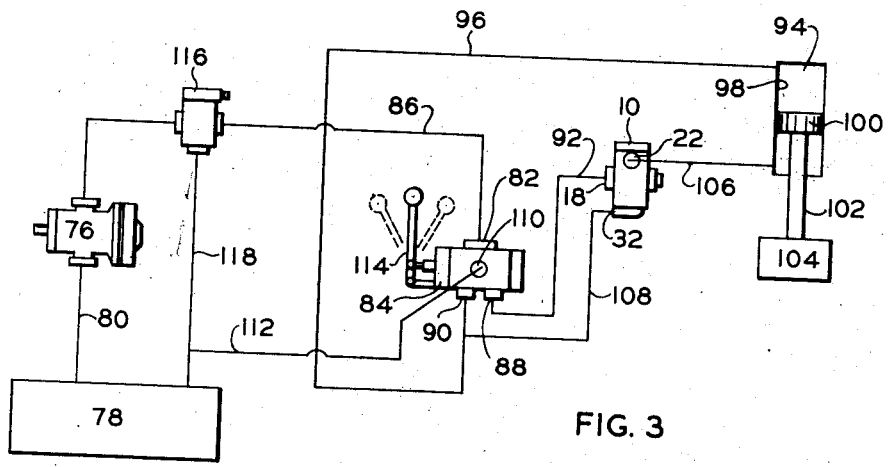
Figure 3 is a diagrammatic view of a hydraulic power transmission system incorporating the present invention.

Referring now to Figure 3, there is shown a hydraulic transmission having a fluid pump 76 which may be driven by an electric motor (not shown) which is connected to a tank 78 by means of a suction conduit 80 and connected to the pressure port 82 of a suitably four-way directional valve 84 by means of a delivery conduit 86. Two motor ports 88 and 90 of the valve 84 are connected respectively to the inlet port 18 of valve 10 by means of a conduit 92 and to the head end of a motor 94 by means of a conduit 96. The motor 94 is comprised of a cylinder 98 having a piston 100 reciprocably mounted therein to which is connected a piston rod 102. For purposes of simplicity, a weight 104 is connected to the rod 102 but it should be understood that this is for purposes of illustration only, and that the motor may drive a machine element such as a press.

The outlet port 22 of valve 10 is connected to the rod end of the motor 94 by means of a conduit 106. The control port 32 of valve 10 is connected to the conduit 96 by means of a conduit 108. A tank port 110 of control valve 84 is connected to tank 78 by means of a conduit 112. The control valve 84 may be of the open center type which in a neutral position connects the motor ports and the pressure port to the tank 78 so as to completely unload the pump 76 when the motor 94 is stopped. When the handle 114 is moved to the right the valve connects pressure port 82 to motor port 90 while connecting motor port 88 to tank port 110. When the handle 114 is moved to the left, motor port 88 is connected to pressure port 82 while motor port 90 is connected to tank port 110. A relief valve 116 is incorporated in the pump delivery conduit 86 for the purpose of relieving excessive pressure fluid to tank 78 by means of a conduit 118.

Referring now to Figures 1 and 3, with the pump running and control valve handle 114 shifted to the left to connect pressure port 82 to motor port 88 and motor port 90 to tank port 110, pressure fluid will be delivered to the inlet port 18 of valve 10 by means of pump delivery conduit 86, directional control valve 84, and conduit 92. Pressure fluid entering the inlet port 18 is conducted to the interior of sleeve 36 by means of inlet chamber 16 and the plurality of ports 42 in the sleeve 36. Due to the fact that both of the springs 54 and 56 offer slight resistance to inlet flow, member 44 and valve 50 both shift upwardly so as to open seat 52 fully and provide free flow from inlet port 18 to outlet port 22 from where fluid is conducted to the lower end of motor 94 by means of conduit 106 to shift piston 100 and the weight 104 upwardly. Discharging fluid from the head end of motor 94 is conducted to the motor port 90 of valve 84 by means of conduit 96 and to tank 78 by means of tank port 110 and conduit 112. If it is desired to reverse the direction of actuation of motor 94, control handle 114 is shifted to the right, and pressure fluid will be delivered to the head end of motor 94 by means of pump delivery conduit 86, pressure port 82 and motor port 90 of control valve 84, and conduit 96.

Pressure fluid is also delivered to the control port 32 of counterbalance valve 10 by means of conduit 108 so as to expose the undersurface of piston 60 and projection 64 to the same pressure existing at the head end of the motor 94. Fluid attempting to discharge from the rod end of motor 94 is blocked from communication with the inlet port 18 by means of member 44 and valve 50. The immediate resultant pressure increase tends to maintain the seating surface 77 of member 44 upon the seat 52 and the seating surface 75 of the valve 50 upon the seat 48 formed in the member 44. Almost instantaneously a pressure increase results sufficient to shift piston 60 against the opposing pressure forces tending to maintain valve 50 seated. The pressure required to shift piston 50 may be exactly mathematically calculated from the following formula, $$P_3 = \frac{W}{D(R_2 - R_1)}$$

where $W$ = Weight of vertical load
$R_1$ = Ratio of head end to rod end area of motor 94
$A_2$ = Area of seat 48
$B$ = Effective area of piston 60

$$R_2 = \frac{B}{A_2}$$

$D$ = Effective area of rod end of motor 94
$P_3$ = Inlet pressure required to open valve 50 for downward movement of weight 104

It should be noted that the total area of the piston 60 and the projection 64 exposed to pressure at the control port 32 is substantially greater than the surface area of the valve 50 exposed to pressure existing at the outlet port 22. It has been found that where this differential area constitutes a ratio of approximately 7 to 1 that very favorable results are secured and that this ratio will meet the requirements of practically any hydraulic power transmission of the type being considered.

During set-up of the machine tool, such as a vertical broaching machine the proper adjustment of plug 68 will have been made so as to properly limit the travel of piston 60 and projection 62 so as to regulate the opening of seat 48. If the upward travel of piston 60 is decreased the valve 50 will be shifted a proportionately smaller degree so as to decrease the size of the opening of the seat 48.

The adjustment of the travel of piston 50 will be made usually so that the restricted opening through the seat 48 imposes a pressure at the load end of the motor sufficient to counter-balance the weight imposed thereon. In addition any chattering may be entirely eliminated by proper adjustment.

Upon projection 62 shifting valve 50 so as to form a restricted opening through the seat 48 fluid may discharge to the tank 78 from the motor 94 by means of conduit 106, outlet port 22, recess 20, the plurality of ports 48 in member 44, seat 48, sleeve 36 and the ports 42 therein, inlet chamber 16, outlet port 18, conduit 92, motor and tank ports 88 and 110 of valve 84 and conduit 112.

If during the downward movement of piston 100 it is desired to stop the motor 94 the handle 114 of valve 84 is shifted to the center position to connect the motor ports 88 and 90 and the pressure port 82 to the tank port 110. The complete flow of fluid from pump 76 will be by-passed to tank 78 so as to completely unload the former and the pressure formerly existing at the control port 32 which had shifted piston 60 upwardly now becomes non-existent because of control port 32 being connected to tank 78 through the conduit 108, conduit 90, motor and tank ports 90 and 110 of valve 84 and conduit 112. The weight of the load on the piston 100 and the springs 54 and 56 will maintain the valve 50 and the member 44 seated so as to block the outlet from the inlet. As previously mentioned the construction of the seating surfaces of the member 44 and valve 50 together with the sharp-edged seats 48 and 52 will prevent leakage from the outlet port 22 through the inlet port 18 and the motor 94 will remain stopped without any creeping.

Likewise, the motor 94 may be stopped during an upward movement of the load device by simply shifting the control handle 114 of the valve 84 to the open center position and the same action takes place as described in the stopping of the motor during downward actuation thereof.

Although it is not necessary for the check valves 50 and 44 to be concentrically located as to each other for proper operation of the valve 10 it should be noted that the invention in its preferred form incorporates the construction shown in Figure 1 because of simplicity and economy of manufacture and ease of maintenance.

It should be noted that the double check valve construction not only prevents leakage from the load end of the motor when the motor is stopped so as to prevent creepage but that in combination with the pressure responsive piston to unseat the smaller check valve, controls the flow of fluid from the load end of the motor on the downward stroke thereof to prevent chattering.

It should also be noted that this controlled flow of fluid from the load end of the motor may be adjustably controlled to meet the requirements of a variety of hydraulic transmission systems of this type and may be adjusted to prevent chattering in any one particular system when encountered.

While the form of embodiment of the invention as herein disclosed constitutes a preferred form, it is to be understood that other forms might be adopted, all coming within the scope of the claims which follow.

What is claimed is as follows:

1. A counterbalance valve comprising in combination a pair of check valves concentric to each other, one of which is provided with a seat for the other, both check valves opening to flow in one direction and closing under the application of pressure in the opposite direction, fluid operated means responsive to pressure increases for shifting the other check valve to restrictively open the seat, said means including a piston having a pressure effective area substantially greater than the pressure effective area of the other check valve exposed to pressure in the opposite direction, the stroke length of said piston determining the size of the restrictive opening of the seat, and means for adjusting the stroke length of the piston to adjust the size of the restrictive opening of the seat.

2. A counterbalance valve comprising in combination a pair of check valves concentric to each other, one of which is provided with a seat for the other, both check valves opening to flow in one direction and closing under the application of pressure in the opposite direction, fluid operated means responsive to pressure increases for shifting the other check valve to restrictively open the seat, said means including a piston concentric to the check valves having a pressure effective area substantially greater than the pressure effective area of the other check valve exposed to pressure in the opposite direction, the pressure effective areas of the piston and the other check valve being adapted to be simultaneously exposed to the application of pressure in the opposite direction for opening the other check valve and the stroke length of said piston determining the size of the restrictive opening of the seat, and means for adjusting the stroke length of the piston to adjust the size of the restrictive opening of the seat.

3. A counterbalance valve comprising in combination a pair of check valves concentric to each other, one of which is provided with a seat for the other, both check valves opening to flow in one direction and closing under the application of pressure in the opposite direction, fluid operated means having a pressure responsive area substantially greater than the pressure responsive area of the other check valve exposed to pressure in the opposite direction for shifting the other check valve to a position restrictively opening the seat, and means for limiting the operational movement of the fluid operated means for adjusting the size of the restrictive opening of the seat.

4. A counterbalance valve comprising in combination a housing having a flow passage provided with an inlet and an outlet, a pair of check valves shiftably mounted in the passage concentric to each other, one of the check valves being provided with a seat for the other check valve, and both check valves opening to flow from the inlet to the outlet and closing under the application of pressure in the opposite direction, fluid operated means responsive to pressure in the opposite direction for shifting the other check valve to a position restrictively opening the seat, said fluid operated means including a pressure responsive area substantially greater than the pressure responsive area of the other check valve exposed to pressure in the opposite direction, and means for limiting the operational movement of the fluid operated means for adjusting the size of the restrictive opening of the seat.

WILLIAM G. FINLAYSON.

References Cited in the file of this patent

UNITED STATES PATENTS

| Number | Name | Date |
|---|---|---|
| 1,020,535 | Brenner | Mar. 19, 1912 |
| 1,194,965 | Darrow | Aug. 15, 1916 |
| 1,209,753 | Phillips | Dec. 26, 1916 |
| 1,860,929 | Froelich | May 31, 1932 |
| 2,038,167 | Farmer | Apr. 21, 1936 |
| 2,244,894 | Parker | June 10, 1941 |
| 2,328,979 | Herman | Sept. 7, 1943 |

FOREIGN PATENTS

| Number | Country | Date |
|---|---|---|
| 432,390 | Great Britain | July 25, 1935 |